Patented Dec. 5, 1939

2,182,397

UNITED STATES PATENT OFFICE 2,182,397

MANUFACTURE OF ETHER DERIVATIVES OF POLYHYDRIC ALCOHOLS

Eddy W. Eckey, Wyoming, Ohio, assignor to The Procter & Gamble Company, Cincinnati, Ohio, a corporation of Ohio No Drawing. Application July 9, 1937,
Serial No. 152,811

16 Claims. (Cl. 260—411)

This invention relates to a process for forming ether derivatives of polyhydric alcohols, including derivatives that contain esterified fatty acid groups.

Its object is to provide a new and improved process for making such compounds.

My process consists in first reacting a carboxylic acid, especially a fatty acid, with a polyhydric alcohol in suitable proportions to cause the acid to esterify a portion of the hydroxyl groups of the alcohol and then causing a further reaction to take place under certain suitable conditions as described in the following, until some or all of the unesterified hydroxyl groups are converted to ether groups by combining with hydroxyl groups of other molecules of alcohol, with elimination of water. This condensation to ether derivatives takes place easily under the conditions described after first forming the esters, or introducing same into the reaction mixture, but only slowly or with difficulty in the absence of esters.

The term "ether derivative of a polyhydric alcohol" broadly covers any such ether derivative, including those formed by the union of two or more molecules of a single polyhydric alcohol, or of different kinds of polyhydric alcohols, or of a polyhydric alcohol and a monohydric alcohol, or of a polyhydric alcohol which has been partially esterified with a carboxylic acid and another alcohol.

It is well known that polyhydric alcohols can be changed partially to ether derivatives if heated to a high temperature, particularly in the presence of an alkaline catalyst. For example, if glycerol is heated for several hours at 260° C. in the presence of an alkaline catalyst such as sodium carbonate, water is evolved and the glycerol becomes etherified by reaction that may be indicated as follows:

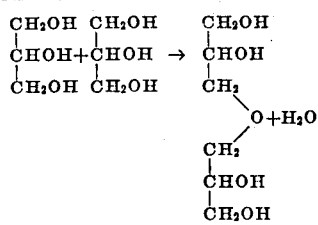

It is known also that fatty esters of such compounds can be made by heating fatty acid with the polyhydric alcohol that previously has been condensed or esterified by heating to a high temperature. Thus di-glycerol stearate can be formed by reacting stearic acid with previously formed diglycerol. This reaction may be indicated as follows:

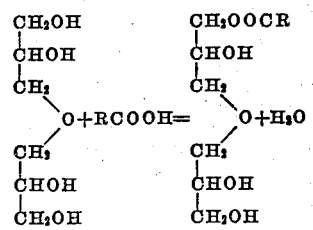

It has been proposed also to heat glycerol and fat in the presence of an alkaline catalyst for several hours at temperatures between 250 and 280° C. to form fatty esters of polyglycerol.

My process provides a convenient means for preparing this type of compound at much lower temperatures than have heretofore been used, temperatures at which the polyhydric alcohols are thermally stable, thus avoiding the partial decomposition, formation of undesired by-products, loss of material and impairment of quality associated with the high-temperature processes hitherto known. The reaction takes place at temperatures below 200° C. when xylene is used as the water carrier in suitable quantity, and below 150° C. when toluene is used in like suitable quantity, the actual temperature varying somewhat with the proportion of water carrier and other ingredients used. In carrying out my improved process, I bring together a quantity of a polyhydric alcohol and a quantity of a carboxylic acid which is only sufficient to esterify a portion of the hydroxyl groups of each molecule of the polyhydric alcohol entering into the reaction, thus leaving one or more hydroxyl groups in each molecule unesterified. An excess of the polyhydric alcohol may or may not be present. A suitable solvent is added to the mixture, which will dissolve both the polyhydric alcohol and the carboxylic acid, thus greatly facilitating the esterification by bringing them into reacting contact with each other. A suitable water carrier is added whose function is explained below. Finally a small quantity of an esterifying catalyst, such as sulfuric acid, is added. This mixture is then heated to boiling when esterification gradually occurs between the acid and a portion of the hydroxyl groups of the polyhydric alcohol with elimination of water in the reaction, which is distilled as fast as formed. After esterification is complete as shown by the amount of water distilled off, boiling is continued resulting in elimination and distillation of substantial additional quantities of water due to conversion of unesterified groups of the alcohol to ether groupings. The etherification is believed to take place mainly between molecules of the polyhydric alcohol which have already been partly esterified or between such molecules and molecules of unesterified alcohol.

It is also possible in many cases, instead of starting with a carboxylic acid and polyhydric alcohol, to start with a previously formed ester of the acid and a polyhydric alcohol containing one or more free hydroxyl groups per molecule, and use this in the previously described mixture in place of the free acid and a corresponding quantity of the polyhydric alcohol. Etherification then takes place as before mentioned. The uncombined alcohol used for thus forming the ether grouping may or may not be the same alcohol as used in the esterification, and, in fact, it is possible to use a monohydric alcohol to form the ether derivative with the partially esterified polyhydric alcohol, if desired.

My process offers a means of forming ether groupings either between an unesterified hydroxyl of the ester and another molecule of alcohol, or between two or more molecules of alcohols which may or may not be of the same kind, but in all such cases it is necessary to have present some ester of a polyhydric alcohol containing one or more free hydroxyls per molecule. In thus forming mixed ethers one of the alcohols may even be a monohydric alcohol. Any alcohol used should preferably have a boiling point above that of water and of the "water carrier", but a low boiling alcohol could also be used if desired, by condensing and refluxing same to the boiling mixture along with the water carrier.

To obtain the etherified alcohols free from ester, the ester may be decomposed by saponifying with alkali and acidifying, or it may be hydrolyzed by boiling the mixture with water, preferably at an elevated temperature under superatmospheric pressure; the fatty acid, or other acid used, may then be removed by separating as a layer or by other means depending on the properties of the acid used. The solution containing the etherified polyhydric alcohols may then be concentrated by evaporation of water under vacuum to obtain the alcohols, and these may be freed from unreacted alcohol by fractional distillation under high vacuum (or low absolute pressure).

The most common polyhydric alcohols suitable for my purpose are glycerol and the glycols. Various glycols may be used, such as ethylene glycol, propylene glycol, trimethylene glycol, etc. Other polyhydric alcohols such as sorbitol and mannitol also come within the scope of my invention. The ether derivatives formed from glycol are commonly called "polyglycols" and those formed from glycerol are frequently called "polyglycerols". When only two molecules of glycerol are etherified, the product is sometimes called "diglycerol".

The carboxylic acids suitable for the practice of my invention may be any carboxylic acid containing two or more carbon atoms, but I find that the most useful acids are those of the fatty series containing from eight to about twenty-two carbon atoms per molecule, and more especially those derived from natural fats and oils having usually from twelve to eighteen carbon atoms per molecule. Fatty acids suitable for the practice of this invention may also be made synthetically, as by the oxidation of paraffin hydrocarbons. Aromatic acids and other carboxylic acids such as benzoic acid, phthalic anhydride and fumaric acid are suitable. A single carboxylic acid or a mixture may be used.

Solvents suitable for use in my process must be capable of dissolving both the fatty acid and the polyhydric alcohol used in the reaction to form a substantially homogeneous mixture at the boiling point of the complete mixture used. In some cases, especially when starting with reacting ingredients which are mutually soluble, a solvent is not necessary. The solvent itself must have a boiling point sufficiently above that of the water carrier so that it will not distill over with said water carrier to an objectionable extent, and at the same time its boiling point should be lower than that of the products of the reaction so that the solvent itself can be distilled off after the reaction is completed. It must also be stable and chemically inert in the reaction. Phenol has been found to be satisfactory for this purpose. It does not enter into the reaction and can be removed, as by distilling or washing, after the reaction is completed. Other materials, such as cresol, meeting the above specifications may also be used.

As a "water carrier" an organic solvent is used which will boil at a lower temperature than the other ingredients of the mixture previously mentioned, and which will carry away on distillation the water formed in the reaction along with its own vapor. It must separate from water when the mixed vapors are condensed to liquid and cooled and may or may not be miscible with the other ingredients, but should be capable of being condensed readily so that it can be returned to the reaction mixture after separation from the water. Toluene, xylene and benzene are suitable agents for this purpose. They are inert in the reaction and can readily be removed by distillation after the reaction is completed. It is important in carrying out the process that the water formed by the reaction be carried away as fast as formed.

As esterifying catalysts for my purpose, various substances may be used, but those most suitable consist of sulfuric acid and certain aromatic sulfonic acids commonly known as Twitchell reagents or saponification catalysts. The quantity required is small, being usually about 0.05 per cent. to 1 per cent. of the quantity of alcohol used, in terms of sulfuric acid or its chemical equivalent in other acids. The catalyst can be neutralized or removed by washing after the reaction is completed.

*Example 1.*—As an example of my process, I mixed 100 grams of commercial stearic acid having a saponification value of 210, 130 grams of glycerol, 100 grams of phenol, 60 grams of toluene and 0.2 gram of sulfuric acid. This mixture was placed in a three-necked flask. Into one neck was inserted a thermometer; into another was inserted a mechanical agitator, and the third neck was connected to a Bidwell-Sterling tube and reflux condenser. The mixture was heated to boiling which began at about 131° C. and rose to about 143° C. during the progress of the operation. The solution was clear, and boiling was continued for about three hours, with distillation of the toluene and the water formed in the reaction. The condensed toluene was continually returned to the reaction vessel, while the condensed water was separated from the condensed toluene by means of the Bidwell-Sterling tube, collected, and measured. During this period, 16.8 c. c. of water was collected. This is about 10.1 c. c. more water than the calculated result from mere esterification of the stearic acid, the excess resulting from etherification of hydroxyl groups. The acid catalyst was then neutralized by addition of 0.5 gram of disodium phosphate, the toluene and phenol were distilled off with steam, and the product was washed with water to remove salts and any free glycerol or polyglycerols, and dried. The product then showed the following characteristics on analysis: acid value, 1.8; saponification value, 152; hydroxyl value, 284; total fatty acids, 72.0; appearance of product, soft wax about like beeswax; light orange-yellow color; foamed slightly in warm water.

The term "hydroxyl value" as used herein denotes the number of milligrams of potassium hydroxide corresponding to the hydroxyl groups in one gram of sample.

This product of Example 1 is the stearic acid ester of a polyglycerol. It has good emulsifying properties and has various other uses. When properly purified it makes a useful ingredient of shortenings.

*Example 2.*—As an example to show preparation of free polyglycerol, a mixture of 126 parts of crude monoglyceride of commercial oleic acid, (made by heating 100 parts of commercial oleic acid with 32.6 parts of glycerol), 97.4 parts glycerol, 60 parts toluene, 100 parts phenol, and 0.4 part sulfuric acid is boiled in an apparatus arranged for total condensation of the boiling water carrier and the water evolved in the reaction, and return of the condensed water carrier to the boiling reaction mix in such a way that water condensing with the carrier is first settled out before the carrier is returned to the reaction vessel. The boiling is continued until 13 parts of water have been removed in this way.

The sulfuric acid is neutralized and the mixture is blown with steam under reduced pressure to distill off the toluene and phenol. The product freed from toluene and phenol is then saponified to remove the combined fatty acid, either by boiling with caustic soda solution and acidulating, or preferably by heating with water in an autoclave. The resulting fatty acid is separated from the aqueous solution of alcohols by settling or other suitable means.

The aqueous solution of alcohols thus obtained is concentrated by evaporation of the water under diminished pressure, yielding a mixture consisting predominantly of condensed or etherified glycerol such as is commonly called polyglycerol. Fractional distillation of this mixture under low absolute pressure yields a first fraction of about 25 per cent. of the total weight, consisting of unchanged glycerol; a second fraction with higher boiling point, greater density, greater viscosity, and smaller proportion of free hydroxyl groups as determined by the acetin method, these characteristics corresponding with a product consisting mainly of diglycerol; and finally a residue in the still with even greater density and viscosity and with smaller hydroxyl value, corresponding with polyglycerol products more highly condensed than diglycerol.

Other products of the same types can be made following the same general procedure by using other alcohols such as a glycol or a mixture of alcohols, as previously described, causing varying proportions of the free hydroxyl groups to combine to form ether groups.

Having thus described my invention, what I claim and desire to secure by Letters Patent is:

1. In a process for forming ether derivatives of polyhydric alcohols, the steps of boiling a mixture of an ester consisting of a polyhydric alcohol partially esterified with a carboxylic acid, a water carrier having a lower boiling point than the aforementioned mixture of ingredients and immiscible with water, and a catalyst selected from the group consisting of sulfuric acid and the sulfonic acids, and distilling off from said boiling mixture the water formed by the reaction.

2. A process for forming ether derivatives of fatty acid esters of polyhydric alcohols which comprises mixing together polyhydric alcohol, fatty acid ester of polyhydric alcohol, said ester containing molecules having at least one free hydroxyl group, a catalyst selected from the group consisting of sulfuric acid and the sulfonic acids and a water carrier consisting of a volatile solvent having limited miscibility with water, heating the mixture to a temperature sufficient to cause etherification, and distilling out of the reacting mixture the resulting water together with a portion at least of the water carrier.

3. The process of claim 2, with the additional steps of condensing the vapors from the reaction mixture, separating the distilled water carrier from the main portion of the water condensed with it and returning the water carrier to the reaction mixture.

4. In a process for forming ether derivatives of polyhydric alcohols, the steps of boiling a mixture of a polyhydric alcohol, a fatty acid in amount less than that requisite for esterifying all the hydroxyl groups in each molecule of said alcohol, a mutual solvent for said fatty acid and polyhydric alcohol, a water carrier having a lower boiling point than the aforementioned mixture of ingredients and immiscible with water, and a catalyst selected from the group consisting of sulfuric acid and the sulfonic acids, and distilling off from said boiling mixture the water formed by the reaction, said boiling being continued until the water evolved by the reaction is substantially greater than the amount due to esterification of the fatty acid.

5. In a process for forming ether derivatives of polyhydric alcohols, the steps of boiling a mixture of a polyhydric alcohol, a fatty acid in amount less than that requisite for esterifying all the hydroxyl groups in each molecule of said alcohol, a mutual solvent for said fatty acid and polyhydric alcohol having a boiling point above that of the water carrier but below that of the reaction product, in amount sufficient to dissolve said alcohol and fatty acid, a water carrier having a lower boiling point than the aforementioned mixture of ingredients and immiscible with water, and a catalyst selected from the group consisting of sulfuric acid and the sulfonic acids, and distilling off from said boiling mixture the water formed by the reaction, said boiling being continued until the water evolved by the reaction is substantially greater than the amount due to esterification of the fatty acid, and then removing the said water carrier, solvent, and catalyst.

6. In a process for forming ether derivatives of polyhydric alcohols the steps of boiling a mixture of a fatty acid ester of a polyhydric alcohol having at least one free hydroxyl per molecule, an alcohol, a mutual solvent for the said ester and alcohol, a water carrier having a lower boiling point than the aforementioned mixture of ingredients and immiscible with water, and a catalyst selected from the group consisting of sulfuric acid and the sulfonic acids, and distilling off from said boiling mixture the water formed by the reaction, said boiling being continued until a substantial amount of water has been evolved by the reaction, and then removing the said water carrier, solvent, and catalyst.

7. A process for forming ether derivatives of fatty acid esters of glycerol, comprising boiling a mixture of fatty acid, glycerol, phenol, toluene, and a catalyst consisting of sulfuric acid, and distilling off from said boiling mixture toluene with the water formed in the reaction until the amount of water thus distilled is substantially greater than that due to esterification of the fatty acid present in the mixture, the amount of fatty acid used being less than that requisite for esterifying all the hydroxyl groups in each molecule of the glycerol, and the amount of phenol being sufficient to form a substantially homogeneous solution with the fatty acid and glycerol at the reacting temperature.

8. A process for forming ether derivatives of fatty acid esters of glycerol, comprising boiling a mixture of fatty acid, glycerol, phenol, toluene, and a catalyst consisting of sulfuric acid, and distilling off from said boiling mixture toluene with the water formed in the reaction until the amount of water thus distilled is substantially greater than that due to esterification of the fatty acid present in the mixture while returning the condensed toluene to the reaction mixture, and then distilling off the toluene and phenol and removing the sulfuric acid, the amount of fatty acid used being less than that requisite for esterifying all the hydroxyl groups in each molecule of the glycerol, and the amount of phenol being sufficient to form a substantially homogeneous solution with the fatty acid and glycerol at the reacting temperature.

9. A process for forming ether derivatives of fatty acid esters of glycerol comprising boiling a mixture of a fatty acid ester of glycerol containing at least one free hydroxyl per molecule, phenol, toluene, and a catalyst consisting of sulfuric acid, and distilling off from said boiling mixture toluene with the water formed in the reaction, while returning the condensed toluene to the reaction mixture, and then distilling off the toluene and phenol, and removing the sulfuric acid, the amount of phenol being sufficient to form a substantially homogeneous solution with the fatty ester and glycerol at the reacting temperature, and the boiling being continued until a substantial amount of water has been evolved by the reaction.

10. A process for forming ether derivatives of polyhydric alcohols comprising boiling a mixture of a fatty acid ester of a polyhydric alcohol containing at least one free hydroxyl per molecule, an alcohol, a mutual solvent for said fatty ester and alcohol having a boiling point above that of the water carrier but below that of the reaction product, in amount sufficient to dissolve at least the greater part of said fatty ester and alcohol, a water carrier having a lower boiling point than the aforementioned mixture of ingredients and immiscible with water, and a catalyst selected from the group consisting of sulfuric acid and the sulfonic acids, the boiling being continued until a substantial amount of water has been evolved by the reaction, removing the said water carrier and solvent by distillation, hydrolyzing said ester, separating the fatty acids thus liberated, neutralizing the alcohol solution thus formed, and concentrating by evaporation to obtain the ether derivative of the polyhydric alcohol in substantially pure form.

11. In a process for forming ether derivatives of polyhydric alcohols, the steps of mixing together polyhydric alcohol, carboxylic acid in quantity insufficient to esterify completely all of the polyhydric alcohol, a water carrier consisting of a volatile organic liquid having limited miscibility with water and a catalyst selected from the group consisting of sulfuric acid and the sulfonic acids, boiling the mixture, distilling off the water formed in the reaction by means of the boiling water carrier, continuing the boiling after a quantity of water equivalent to the carboxylic acid in the mixture has been evolved, and recovering the resulting ether derivatives from the mixture.

12. The process of claim 11, with the additional step of adding to the reaction mixture a solvent for the ingredients of the mixture in quantity sufficient to make the mixture substantially homogeneous at its boiling point.

13. A process for forming ether derivatives of fatty acid esters of glycerol, comprising boiling a mixture of fatty acid, glycerol, phenol, toluene, and a catalyst consisting of sulfuric acid, and distilling off from said boiling mixture toluene with the water formed in the reaction until the amount of water thus distilled is substantially greater than that due to esterification of the fatty acid present in the mixture while returning the condensed toluene to the reaction mixture, the temperature being kept below about 150° C. up to this point by regulating the amount of toluene used, and then distilling off the toluene and phenol and removing the sulfuric acid, the amount of fatty acid used being less than that requisite for esterifying all the hydroxyl groups in each molecule of the glycerol, and the amount of phenol being sufficient to form a substantially homogeneous solution with the fatty acid and glycerol at the reacting temperature.

14. A process for forming ether derivatives of fatty acid esters of glycerol, comprising boiling a mixture of fatty acid, glycerol, phenol, xylene, and a catalyst consisting of sulfuric acid, and distilling off from said boiling mixture xylene with the water formed in the reaction until the amount of water thus distilled is substantially greater than that due to esterification of the fatty acid present in the mixture while returning the condensed xylene to the reaction mixture, the temperature being kept below about 200° C. up to this point by regulating the amount of xylene used, and then distilling off the xylene and phenol and removing the sulfuric acid, the amount of fatty acid used being less than that requisite for esterifying all the hydroxyl groups in each molecule of the glycerol, and the amount of phenol being sufficient to form a substantially homogeneous solution with the fatty acid and glycerol at the reacting temperature.

15. In a process for forming ether derivatives of polyhydric alcohols, the steps of boiling a mixture of an ester consisting of a polyhydric alcohol partially esterified with a carboxylic acid, a water carrier having a lower boiling point than the aforementioned mixture of ingredients and immiscible with water, sulfuric acid as an esterifying catalyst, and distilling off from said boiling mixture the water formed by the reaction.

16. In a process for forming ether derivatives of polyhydric alcohols, the steps of boiling a mixture of an ester consisting of a polyhydric alcohol partially esterified with a carboxylic acid, a water carrier having a lower boiling point than the aforementioned mixture of ingredients and immiscible with water, and as an esterifying catalyst an aromatic sulfonic acid possessing catalytic properties in saponification reactions.

EDDY W. ECKEY.